United States Patent
Cassidy et al.

(10) Patent No.: US 7,089,026 B1
(45) Date of Patent: Aug. 8, 2006

(54) METHOD FOR DETERMINING A CONTROL CHANNEL IN A TRUNKED RADIO COMMUNICATIONS SYSTEM

(75) Inventors: Marc W. Cassidy, Fox River Grove, IL (US); Andor Almasi, Sunrise, FL (US); Donald R. Griffis, Sunrise, FL (US); Tanhoa Trandai, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/214,569

(22) Filed: Aug. 30, 2005

(51) Int. Cl.
- H04Q 7/20 (2006.01)
- H04L 5/14 (2006.01)
- H04B 1/38 (2006.01)

(52) U.S. Cl. .................. 455/520; 455/518; 455/554.1; 370/276; 375/219

(58) Field of Classification Search ............ 455/554.1, 455/520, 519, 73; 370/276; 375/219; 379/419, 379/440
See application file for complete search history.

(56) References Cited

U.S. PATENT DOCUMENTS

| | | | |
|---|---|---|---|
| 4,028,500 A | 6/1977 | McClure et al. | |
| 4,646,345 A | 2/1987 | Zdunek et al. | |
| 4,716,407 A | 12/1987 | Borras et al. | |
| 4,723,264 A | 2/1988 | Sasuta et al. | |
| 4,870,408 A | 9/1989 | Zdunek et al. | |
| 5,225,843 A | 7/1993 | Thompson | |
| 5,809,421 A | 9/1998 | Manssen et al. | |
| 6,188,979 B1 | 2/2001 | Ashley | |
| 6,252,910 B1 | 6/2001 | West et al. | |
| 6,308,050 B1 | 10/2001 | Eklof | |
| 6,519,472 B1 | 2/2003 | Brennan et al. | |
| 6,922,135 B1 | 7/2005 | Abraham | |
| 2004/0018832 A1* | 1/2004 | Dunham .................. | 455/422.1 |

OTHER PUBLICATIONS

TIA TSB-102.AABC, "Project 25 Trunking Control Channel Messages New Technology Standards Project Digital Radio Technical Standards TR-8.10 Subcomittee", May 31, 1996.

TIA TSB-102.AABD, "Project 25 Trunking Procedures New Technology Standards Project Digital Radio Technical Standards", Oct. 1997.

* cited by examiner

Primary Examiner—Tilahun Gesesse
(74) Attorney, Agent, or Firm—Indira Saladi

(57) ABSTRACT

A receiving device in a trunked radio communications system retrieves a first frequency, wherein the first frequency relates to a lowest frequency that the at least one repeater utilizes for transmission and tunes to about the first frequency. If no control channel messages are decoded at the first frequency, then the receiving device tunes to about a second frequency wherein the second frequency is a channel separation of 12.5 kHz from the first frequency. If no control channel messages are decoded at the second frequency, then the receiving device, iteratively increments the second frequency by the channel separation until the second frequency reaches an end of band frequency for the trunked radio communications system.

19 Claims, 2 Drawing Sheets

METHOD FOR DETERMINING A CONTROL CHANNEL IN A TRUNKED RADIO COMMUNICATIONS SYSTEM

FIELD OF THE INVENTION

The present invention relates generally to trunked radio communications systems and more specifically to the field of determining a control channel in a trunked radio communications systems.

BACKGROUND OF THE INVENTION

Typically, a trunked radio communications system comprises at least one site and a number of subscribers that utilize a radio frequency (RF) resource for communications amongst the subscribers. Each site comprises a number of repeaters that correspond to control channels and voice channels that carry the communications of the system. Generally, a subscriber in the trunked radio communications system is preprogrammed with information relating to how to communicate with the site for access to the RF spectrum for trunked communications. Specifically, the subscriber is preprogrammed with an indication of control channels that the subscriber may use for data communications between the subscriber and the site.

If the subscriber is not programmed properly with an indication of the control channels for a site, then the subscriber is not able to utilize the trunked radio communications system for communications until the radio is reprogrammed with the correct control channel information. Further, if the control channel information is changed for the site, each subscriber associated with the site needs to be reprogrammed with the new control channel information.

Currently, reprogramming of subscribers requires manual effort by radio service personnel so that radio service personnel have direct physical access to a given subscriber. It is not always convenient or even possible, however, for all of the subscribers in a given system to be brought, more or less simultaneously, to a common location to permit the physical installation of the new control channel information. As a result, the logistic challenge of reprogramming many subscribers can be challenging.

Thus, there is a need for an improved method of determining a control channel in a trunked radio communications system.

BRIEF DESCRIPTION OF THE FIGURES

The present invention is illustrated by way of example and not limitation in the accompanying figures, in which like references indicate similar elements, and in which.

Figure 1:
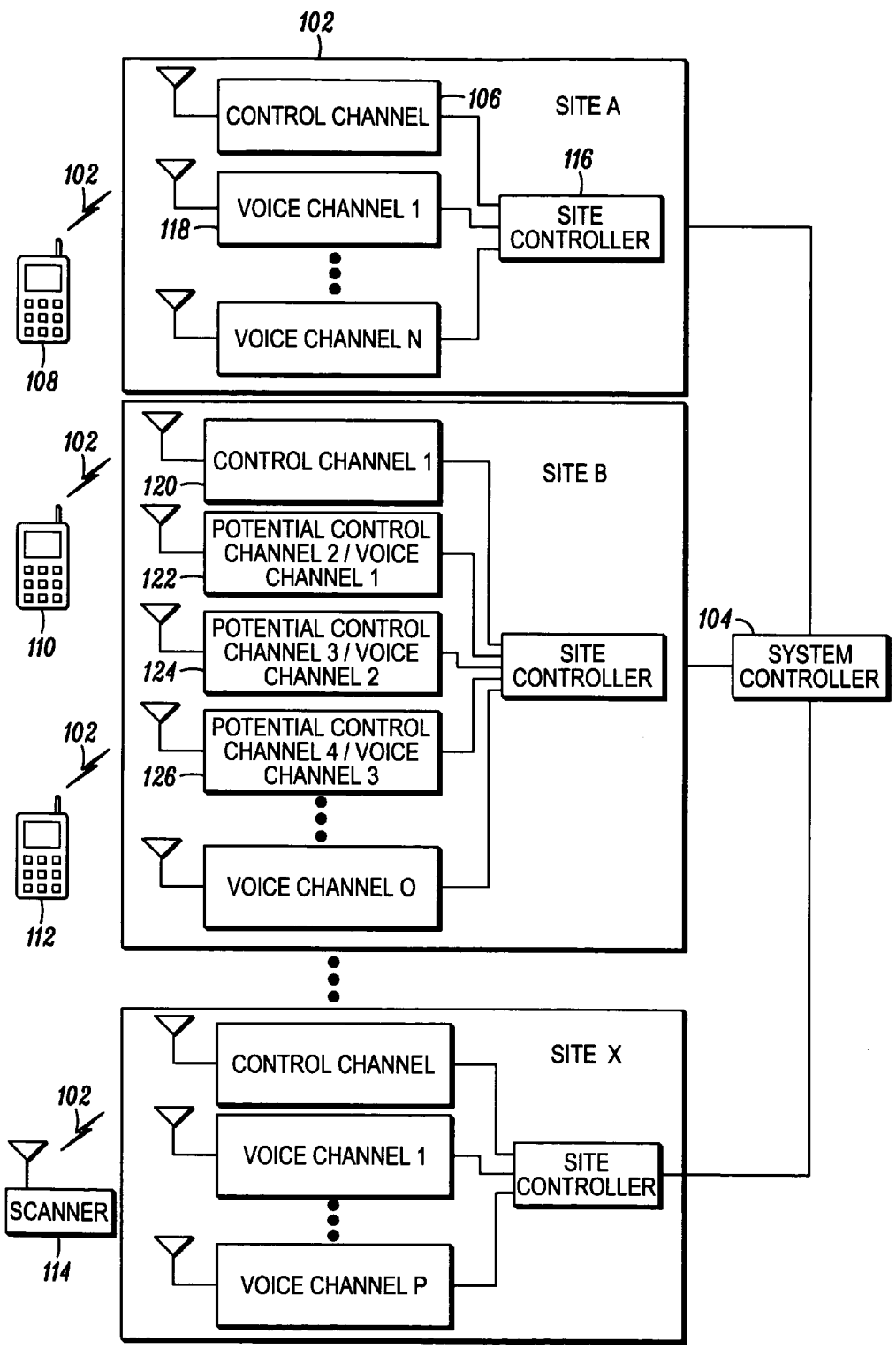
FIG. 1 is a block diagram illustrating a typical trunked communication system in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments of the present invention, it should be observed that the present invention resides primarily in combinations of method steps and apparatus components. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 illustrates a block diagram of a trunked radio communications system 100 that may employ an embodiment of the present invention. Typically, a trunked radio communications system 100 comprises at least one site, e.g. site A, and a plurality of receiving devices, e.g. receiving devices 108–114, so that the receiving devices can receive communications over a radio frequency (RF) resource 102. A site, e.g. site A, typically comprises at least one control channel, a number of voice channels, and a site controller that coordinates access to the RF resource 102 for the receiving devices associated with the site. For example, in FIG. 1, the site controller 116 for site A coordinates access to the RF resource 102 for receiving device 108.

As is known in the art, the RF resource 102 is a transmission medium. In one embodiment, the RF resource 102 comprises RF spectrum in the 800 MHz band. As such, the trunked radio communications system 100 operates in the 800 MHz spectrum.

As is known to one of ordinary skill in the art, the control and voice channels in each site are implemented using "repeaters," where a repeater is an electronic device that receives a RF signal and retransmits a RF signal at a higher power. Further, there is a repeater for each channel, whether voice or control, in the site. Thus, if there are 28 channels in site A, then there are 28 repeaters. Further, each site has a number of control channels and a number of voice channels, where each site has at least one control channel. As shown in FIG. 1, site A has one control channel 106 and N voice channels, where N represents the number of voice channels in site A. As is known to one of ordinary skill in the art, each site may have up to 4 control channels (with only 1 control channel active at one time and the others are potential control channels) and may have up to 27 voice channels (as such, N may be any number up to 27). Thus, illustrating only one control channel 106 for site A and one control channel 120 for site B in FIG. 1 is not meant to be a limitation on an embodiment of the present invention. For example, backup control channels for site B, namely potential control channels 122, 124, 126, are shown for ease in understanding. In any case, the number of control channels and the number of voice channels in one site together may not exceed 28. In any case, a site is defined by control channels, voice channels, and a site controller where the site interfaces with the receiving devices to carry the communications of the trunked radio communications system 100.

FIG. 1 illustrates a plurality of sites, site A, site B, . . . and site X, where X represents the number of sites in the trunked radio communications system 100. An embodiment of the present invention is contemplated to work in a trunked radio communications system 100 with any number of sites. Further, an embodiment of the present invention is contemplated to work in a trunked radio communications system with only one site, e.g. site A.

In a trunked radio communications system 100 of at least two sites, a system controller 104 acts as the system coordinator and is responsible for assigning subscribers 108, 110, 112 to different voice channels at different sites, e.g. site A, site B, so that the subscribers may communicate amongst each other. In a trunked radio communications system 100 of at least two sites, the site controller, e.g. site controller 116, functions to forward control channel messages to the system controller 104. However, in a single site system, the site controller, e.g. site controller 116, performs the functionality performed by the system controller 104. Thus, as used henceforth, the term system controller 104 is used to encompass the functionality that may be performed by either the site controller or the system controller which is to forward control channel messages so that the subscribers of the trunked radio communications system 100 may communicate amongst each other.

The system controller 104 is also responsible for knowing where each of the subscribers are located (i.e. what voice channel and/or what site) and for controlling other features typically found in a modern trunked communication system (e.g. handling phone patches, coordinating groups of radios in emergency situations, etc.). Further, the system controller 104 may comprise a database for keeping track of the subscribers. Typically, the database comprises information relating to keeping track of subscribers and information relating to the subscribers, such as IDs, talkgroup identifiers, and site location. For example, the database may contain information of subscriber 108 such as the subscriber's ID and that subscriber 108 is active in a call on voice channel 118. Further, the information in the database may be updated as the subscribers 108, 110, 112 move in the trunked radio communications system 100 from one site to another site. Further yet, the typical system controller 104 includes a main processing unit such as a computer with appropriate control software that controls the operation of system controller 104. Also normally co-located with the system controller 104 is a dispatch center with a dispatch console that allows dispatchers to communicate with the system's subscribers 108, 110, 112. In a single site system, the dispatch center may be co-located with the site controller 116.

The receiving devices 108–114 are typically mobile or portable devices, such as subscribers 108, 110, 112 and scanner 114. In one embodiment, the subscribers 108, 110, 112 are also known in the art as "radios," and can send and receive communications. In one embodiment, the scanner 114 is known by a number of names, including the term "receiver," "receiving device," "scanner device," and the like. In one embodiment, the scanner 114 is only able to receive communications and not able to send communications. In any case, the receiving devices listen to communications of the trunked radio communications system 100. Even though the terms "receiving device" and "subscriber" are both used in this description, the term "receiving device" is used to refer to the receiving function that is common to both "subscribers" and "scanners," whereas the term "subscriber" is used to refer to the receiving and transmitting operations that are functional in a "subscriber" but not in a "scanner."

Figure 2:
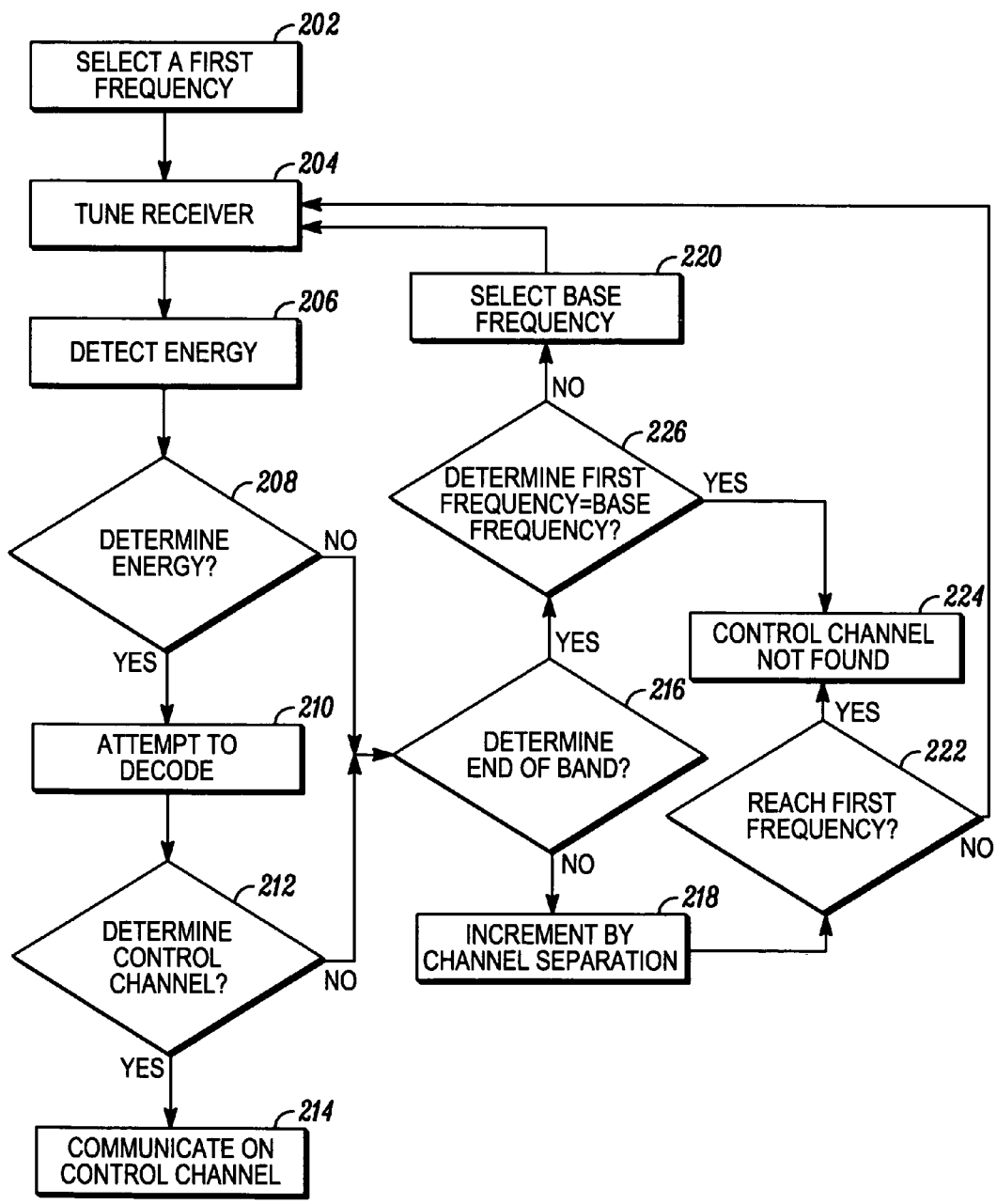
FIG. 2 is a flow diagram illustrating a method for determining a control channel in accordance with an embodiment of the present invention.

An example of a typical trunked communication begins when a receiving device (e.g. subscriber 108) powers up and needs to determine a control channel for the site that the receiving device is within coverage of. Referring now to FIG. 2, a flow diagram showing the steps taken by one of the receiving devices 108–114 in accordance with an illustrative embodiment of the invention is shown. In step 202, the receiving device selects a first frequency, e.g. from its memory. As such, the receiving device may be preprogrammed with the first frequency or may receive knowledge of the first frequency from other means. In one embodiment, the first frequency relates to a base frequency, namely a lowest frequency that a repeater in the system 100 uses for transmission. In one embodiment, the base frequency relates to a value of 851.0000 MHz. In another embodiment, the first frequency relates to a starting frequency where the starting frequency is any frequency in the 800 MHz band that a repeater utilizes for transmission. For example, the first frequency may relate to 864.1250 MHz.

As used herein, "relates to" means that the relationship between the first frequency and the frequency that the receiving device tunes to in step 204 may be achieved by any mathematical operations. For example, the receiving device may take the number 851.0125 MHz and the receiving device may tune to 851.0000 MHz by subtracting 12.5 kHz. As is known to one of ordinary skill in the art, storing a lesser or greater number and performing a calculation to arrive at the tuned frequency is considered to be equivalent. For example, storing 400, multiplying by 2, and adding 51 is considered to be related to the base frequency of 851.0000. Further, the first frequency may be stored in any electronic format. For example, the first frequency may be stored in hexadecimal format. In any case, as is known to one of ordinary skill in the art, such storage formats are considered equivalent.

The receiving device tunes its receiver to about the first frequency (Step 204). As is known to one of ordinary skill in the art, tuning to a frequency means to stabilize the synthesizer to the selected frequency. Further, as used herein, the term "about" is used to represent a variance in the receiving device's capability to stabilize the synthesizer at exactly the first frequency.

In one embodiment, the receiving device detects energy (Step 206) and if the receiving device detects energy at the first frequency (Step 208), then the receiving device attempts to decode messages received while tuned to about the first frequency (Step 210). In another embodiment, the receiving device may not determine whether energy is detected or not (Steps 206, 208), but may attempt to decode messages while tuned to about the first frequency without first determining whether energy is detected or not.

As used herein, detecting energy means to sense RF energy above a specified threshold for a specified length of time. In one embodiment, the receiving device waits a predetermined amount of time before determining whether energy has been detected or not (Step 208). As such, in one embodiment, the receiving device waits 10 msecs during Step 208.

If the receiving device does not detect energy, then the receiving device iteratively increments the frequency to find a control channel. In one embodiment, iteratively incrementing the frequency means to add a channel separation to a next frequency.

Specifically, the receiving device checks whether the tuned frequency is equal to an end of band frequency (Step 216). In one embodiment, the end of the band is a highest repeater transmitter frequency in an 800 MHz trunked radio communications system. As such, a frequency for the end of the band (Step 216) relates to the highest repeater transmitter frequency. In one embodiment, the end of the band frequency relates to 869.9875 MHz.

As mentioned above, as used herein, "relates to" means that the stored end of the band frequency correlates to the highest frequency that a repeater in the system 100 uses for transmission. As such, the relationship may be achieved by any mathematical operations. For example, the receiving device may store the number 869 MHz and the receiving device may add 0.9875 MHz to the stored end of the band frequency before checking whether the tuned frequency is less than the highest frequency that a repeater in the system 100 uses for transmission. As is known to one of ordinary skill in the art, storing a lesser or greater number than 869.9875 and performing a calculation to arrive at 869.9875 MHz is considered to be equivalent to storing the number 869.9875. For example, storing 400, multiplying by 2, adding 69, and adding 0.9875 is considered to be related to the end of the band frequency of 869.9875. In any case, the end of the band frequency may be arrived at by any such mathematical operations.

If the end of band is reached (Step 216), then the receiving device determines whether the first frequency was the base frequency (Step 226). If the receiving device started at the base frequency and has reached the end of the band (Step 226), then the receiving device determines that a control channel has not been found (Step 224). In one embodiment, the receiving device performs an alternate method for determining a control channel which is not described herein and is beyond the scope of this disclosure.

If the end of band is reached (Step 216) and the receiving device did not start at the base frequency, namely at the beginning of the band, then the receiving device selects the base frequency (Step 220) to tune to in Step 204.

If the end of the band is not reached (Step 216), then the receiving device increments to the next frequency that is one channel separation from the frequency that the receiving device is tuned to (Step 218). In one embodiment, the channel separation is a smallest separation between channels in an 800 MHz trunked radio communications system. As such, the channel separation is set to a value of 12.5 kHz. For example, if the receiver has tuned to 851.0125 MHz, then adding a channel separation of 12.5 kHz moves the receiver to 851.0250 MHz.

As is known to one of ordinary skill in the art, adding the channel separation may be performed by any number of equivalent mathematical operations. For example, the receiving device may subtract and then add or may multiply, divide, and then add. If the channel separation is 12.5 kHz, then the receiving device may multiply by 2, divide by 2, and then add 12.5 kHz. As is known to one of ordinary skill in the art, multiplying, dividing, subtracting, and then adding to arrive at the channel separation is considered to be equivalent to adding the channel separation.

After incrementing by the channel separation (Step 218), if the receiving device has reached the first frequency (Step 222), then the receiving device determines that it has not found a control channel (Step 224). As mentioned above, if the receiving device has not found a control channel, then it may select an alternate method of determining a control channel, which is beyond the scope of this disclosure. If the receiving device has not reached the first frequency (Step 222), then the receiving device tunes to the new frequency which is a channel separation from the previous frequency (Step 204).

Returning to attempting to decode (Step 210), if any messages have been decoded, then the receiving device determines whether it has found a control channel (Step 212). The receiving device determines whether it has found a control channel (Step 212) by determining whether any of the messages that have been decoded are control channel messages that are defined by Motorola's 3600-baud radio trunking protocol. In a further embodiment, the receiving device attempts to decode for a specified length of time. In one embodiment, the receiving device waits a predetermined amount of time before determining whether a control channel is found or not (Step 212). As such, in one embodiment the receiving device waits 200 msec during Step 212. If the receiving device determines that a control channel is found (Step 212), then the receiving device listens for system status messages and other control channel messaging (Step 214). The communications that occur once the receiving device has determined a control channel are beyond the scope of this disclosure.

However, if the receiving device does not receive any control channel messages then, the receiving device determines whether it has reached the end of the band (Step 216). As before, if the end of band is reached (Step 216) and the receiving device did not start at the beginning of the band (Step 226), then the receiving device selects the base frequency (Step 220) and tunes to about the base frequency (Step 204). If, however, the receiving device did not reach the end of the band (Step 216), then the receiving device increments by the channel separation (Step 218), and checks whether after incrementing, the receiving device has reached the first frequency (Step 222). If the receiving device has not reached the first frequency, then the receiving device tunes to the new frequency which is a channel separation from the previous frequency (Step 204).

If either the receiving device reached the end of the band and started at the beginning (Step 226) or if the receiving device did not reach the end of the band but came back to where it started (Step 222), then the receiving device determines that the control channel was not found (Step 224).

In summary, the present invention provides a method for determining a control channel in a trunked radio communications system. It requires the receiving device to check frequencies that are a channel separation apart from each other by starting at a first frequency in an 800 MHz trunked radio communications system. By allowing a receiving device to determine a control channel, the receiving device does not have to be preprogrammed with control channels in use in the trunked radio communications system.

It will be appreciated that embodiments of the present invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. As such, these functions may be interpreted as steps of a method. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. In a trunked radio communications system operating in the 800 MHz spectrum wherein the trunked radio communications system comprises at least one site, at least one control channel, at least one voice channel, and a plurality of receiving devices, a method for determining a control channel, the method comprising the steps of:

at a receiving device in the trunked radio communications system:

retrieving a first frequency, wherein the first frequency relates to a frequency in the 800 MHz spectrum;

tuning to about the first frequency;

tuning to about a second frequency wherein the second frequency is a channel separation from the first frequency, wherein the channel separation relates to a value of 12.5 kHz, if no control channel messages are decoded at the first frequency; and iteratively incrementing the second frequency by the channel separation, if no control channel messages are decoded at the second frequency until the second frequency reaches an end of band frequency for the trunked radio communications system, wherein the control channel messages are defined by Motorola's 3600-baud radio trunking protocol.

2. The method of claim 1 further comprising stepping to a base frequency when the receiving device reaches the end of band frequency, if the first frequency is not the base frequency.

3. The method of claim 1 further comprising determining a control channel is not found, if at least one of a) the receiving device reaches the end of band frequency and the first frequency is a base frequency and b) the receiving device reaches the first frequency after iteratively incrementing.

4. The method of claim 1 further comprising the step of detecting energy before decoding for control channel messages.

5. The method of claim 1 wherein the receiving device is at least one of a subscriber, a subscriber unit, a radio, a mobile, a portable, a receiver, a scanner, and a scanner device.

6. The method of claim 1 wherein the first frequency relates to a value of 851.0000 MHz.

7. The method of claim 1 wherein the first frequency is stored in hexadecimal format.

8. The method of claim 1 wherein the end of band frequency relates to a value of 869.9875 MHz.

9. The method of claim 1 wherein relates to further comprises performing mathematical operations to arrive at 12.5 kHz.

10. The method of claim 1 wherein control channel messages are detected for about 200 msecs before determining that a control channel is not found.

11. In a trunked radio communications system operating in the 800 MHz spectrum wherein the trunked radio communications system comprises at least one site, at least one control channel, at least one voice channel, and a plurality of receiving devices, a method for determining a control channel, the method comprising the steps of:

at a receiving device in the trunked radio communications system:

retrieving a base frequency relating to 851.0000 MHz;

tuning to about the base frequency;

tuning to about a second frequency wherein the second frequency is a channel separation from the base frequency, wherein the channel separation relates to a value of 12.5 kHz, if no control channel messages are decoded at the base frequency; and iteratively incrementing the second frequency by the channel separation, if no control channel messages are decoded at the second frequency until the second frequency reaches an end of band frequency for the trunked radio communications system, wherein the control channel messages are defined by Motorola's 3600-baud radio trunking protocol.

12. The method of claim 11 further comprising determining a control channel is not found, if the receiving device reaches the end of band frequency.

13. The method of claim 12 wherein the base frequency is stored in hexadecimal format.

14. The method of claim 12 wherein the end of band frequency relates to a value of 869.9875 MHz.

15. The method of claim 12 wherein mathematical operations may be performed on the channel separation to arrive at 12.5 kHz.

16. The method of claim 11 further comprising the step of detecting energy before decoding for control channel messages.

17. The method of claim 16 wherein energy is detected for about 10 msecs before determining whether energy is detected.

18. The method of claim 11 wherein the base frequency relating to 851.0000 MHz further comprises performing mathematical operations to arrive at 851.0000 MHz.

19. The method of claim 18 wherein relates to further comprises performing mathematical operations to arrive at 869.9875 MHz.

* * * * *